UNITED STATES PATENT OFFICE.

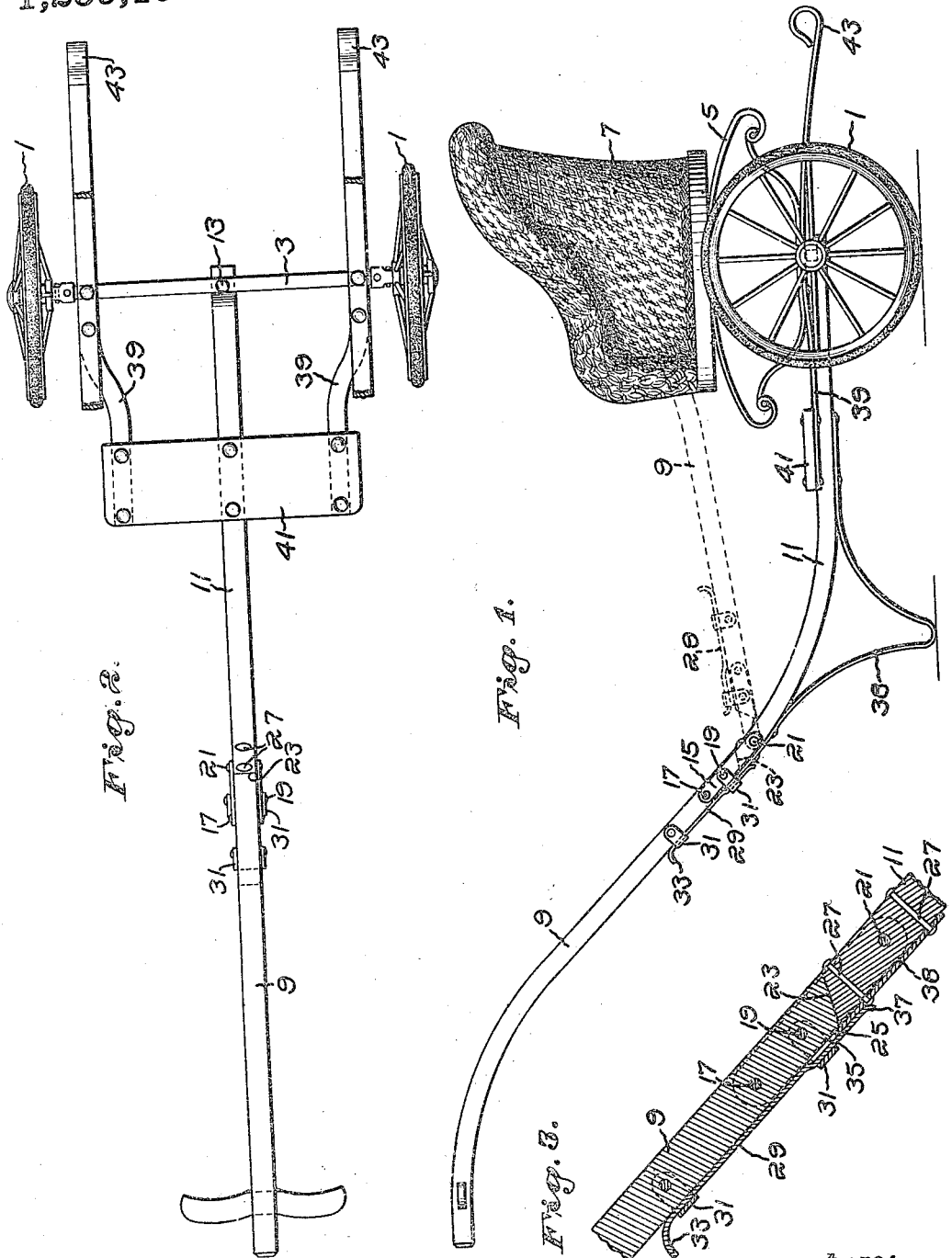

GEORGE B. AMBLER, OF LEOMINSTER, MASSACHUSETTS, ASSIGNOR TO F. A. WHITNEY CARRIAGE COMPANY, OF LEOMINSTER, MASSACHUSETTS, A CORPORATION OF MASSACHUSETTS.

VEHICLE.

1,259,195.  Specification of Letters Patent.  Patented Mar. 12, 1918.

Application filed July 7, 1915. Serial No. 38,525.

*To all whom it may concern:*

Be it known that I, GEORGE B. AMBLER, a citizen of the United States, and a resident of Leominster, Massachusetts, have invented an Improvement in Vehicles, of which the following description, in connection with the accompanying drawings, is a specification, like characters on the drawings representing like parts.

This invention relates to vehicles and more particularly to children's sulkies.

The character of the invention may be best understood by reference to the following description of an illustrative embodiment thereof shown in the accompanying drawing, wherein,—

Figure 1 is a side elevation of the illustrative vehicle shown herein as embodying the invention;

Fig. 2 is a plan of the vehicle with the seat removed therefrom; and

Fig. 3 on an enlarged scale is a longitudinal section through parts of the handle tongue.

Referring to the drawing, the illustrative vehicle shown therein as embodying the invention, comprises wheels 1 detachably connected to an axle 3 having fast thereon curved leaf springs 5 supporting a seat 7. Preferably this seat is constructed of woven reed material formed to present a pleasing design and to afford comfort to the occupant thereof. The springs may be of substantial length extending beyond the seat and have sufficient resilience to take up jolts and prevent the transmitting of jars from the wheels to the seat.

To propel the sulky it is provided with a handle tongue of wood or other appropriate material of substantial length and curved forwardly and upwardly with graceful contour. This tongue comprises an upper section 9 and a lower section 11, the latter being secured directly to the axle by a bolt 13.

The tongue sections are pivotally connected to permit the folding of the upper section from its extended position shown in full lines in Fig. 1, to its folded position with its end resting on the seat as shown in dotted lines in said figure. To accomplish this, the upper section is provided with a pair of opposed links 15 secured thereto by rivets 17 and 19. These links extend beyond said section and overlap the lower section and are pivotally connected thereto by a rivet 21.

To limit the rocking of said upper section in a contra-clockwise direction, Fig. 1, to its extended position, the meeting ends of the sections are mitered to meet on the line 23, thus forming a rule joint, breakable in but one direction. To further limit this movement of the upper section, a stop is provided typified herein by the end 25 of a ribbon-like strip of metal secured to the lower tongue section by rivets 27.

To lock the sections in extended relation, a lock bar 29 is applied to the lower face of the top section and is adapted to slide longitudinally thereof in straps 31 secured to said section. The upper end of this bar is curved outward to present a handle 33, and the lower end thereof is offset to present a portion 35 adapted to overlap the strip forming the stop 25. The lower terminal of the bar may have an outwardly curved lip 37 to facilitate its riding over into overlapped relation with said stop strip.

The bar 29 may be readily slid to or from overlapped relation with the lower section in the manner of a splice or fish, and when overlapping the latter will hold the upper section securely locked in extended position. The bar 29 has sufficient resilience so that when it is slid along the stop strip 25 it is tensioned somewhat and thereby securely holds the top section against said stop without any lost motion or rattling of the parts.

To limit forward rocking of the sulky, there is provided a forward foot 38 conveniently formed as a continuation of the stop strip referred to.

To prevent side swinging of the tongue relatively to the axle and strengthen its connection therewith, hounds or bars 39 may be secured to the axle and to a foot board 41 riveted to the lower tongue section. These bars may extend rearward a substantial distance beyond the axle and have their ends reversely curved upward to present feet 43 for limiting the rearward tilting of the vehicle. Preferably said bars are secured directly to the axle and interposed between the latter and the springs 5 referred to, said springs being riveted to said bars, thereby providing a compact, strong, simple construction.

By the pivotal connection and lock for the tongue sections, the upper section may be very readily folded to and from its extended position and be held in the latter position by a simple adjustment. The locking device is compact, lies close to the sections, does not have any parts projecting any substantial distance beyond said sections, and is located beneath the latter where it is inconspicuous and out of the way.

Having described one illustrative embodiment of the invention without limiting the same thereto, what I claim as new and desire to secure by Letters Patent is:

1. A vehicle comprising in combination, wheels, an axle therefor, a handle tongue comprising pivotally connected sections, straps secured to one of said sections, and a lock bar adapted to slide in said straps along said section into overlapped relation with the other section.

2. A vehicle comprising in combination, wheels, an axle therefor, a tongue comprising sections (9 and 11), opposed links (15) fast on one and pivotally connected to the other, and a lock bar (29) applied to one and adapted to slide along into overlapped relation with the other.

3. A vehicle comprising in combination, wheels, an axle therefor, a tongue including pivotally connected sections, a foot for limiting forward tilting of the vehicle, stop means forming a continuation of said foot for limiting the rocking of one of said tongue sections to extended position, and means for locking said section in said position.

4. A vehicle comprising in combination, wheels, an axle therefor, a handle tongue comprising pivotally connected sections, and means to lock said sections in extended relation including a lock bar mounted on one of said sections and adapted to slide axially thereof into overlapped relation with the other section.

5. A vehicle comprising in combination, wheels, an axle therefor, a handle tongue comprising pivotally connected bars having opposed ends for abutting engagement when said bars are in extended relation, and a lock bar mounted on one of said bars and adapted to slide into overlapped relation with the other bar to secure them in extended relation.

6. In a vehicle, a truck, a tongue extending therefrom and comprising pivoted sections and a resilient locking member to hold said sections against pivoting movement secured to one section and adjustable to be tensioned over and to overlie in the manner of a splice the joint between the sections.

7. In a vehicle a truck, a tongue extending therefrom and comprising sections pivoted together by a rule joint breakable in but one direction and means to prevent breaking of said joint in the opposite direction comprising a resilient splice member secured to one section and adjustable to be tensioned over and to overlie said joint and serving thereby also to tension the joint.

8. A vehicle comprising in combination, wheels, an axle therefor, a seat mounted on said axle, a tongue comprising forward and rear pivotally connected bars, means to secure said rear bar to said axle, hounds connected to said rear bar and axle, and means to lock said bars in extended relation including a lock member mounted on one of said bars and adapted to slide axially along a face thereof into engagement with the other bar.

In testimony whereof, I have signed my name to this specification, in the presence of two subscribing witnesses.

GEORGE B. AMBLER.

Witnesses:
 HENRY WILLIAMS,
 ROBERT H. KAMMLER.

Copies of this patent may be obtained for five cents each, by addressing the "Commissioner of Patents, Washington, D. C."